United States Patent
Klesyk

(10) Patent No.: US 10,348,088 B2
(45) Date of Patent: Jul. 9, 2019

(54) BI-DIRECTIONAL LOW VOLTAGE DC TO AC INVERTER

(71) Applicant: Lear Corporation, Southfield, MI (US)

(72) Inventor: Krzysztof Klesyk, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 244 days.

(21) Appl. No.: 15/367,664

(22) Filed: Dec. 2, 2016

(65) Prior Publication Data

US 2018/0159325 A1   Jun. 7, 2018

(51) Int. Cl.
| | |
|---|---|
| *B60L 1/00* | (2006.01) |
| *H02J 3/00* | (2006.01) |
| *H02J 7/00* | (2006.01) |
| *H02J 7/02* | (2016.01) |
| *H02M 1/32* | (2007.01) |
| *H02M 7/48* | (2007.01) |
| *B60L 53/22* | (2019.01) |
| *H02M 3/335* | (2006.01) |
| *H02M 7/797* | (2006.01) |

(52) U.S. Cl.
CPC .................. *H02J 3/00* (2013.01); *B60L 1/00* (2013.01); *B60L 1/003* (2013.01); *B60L 53/22* (2019.02); *H02J 7/0052* (2013.01); *H02J 7/022* (2013.01); *H02M 1/32* (2013.01); *H02M 3/33507* (2013.01); *H02M 7/4807* (2013.01); *H02M 7/797* (2013.01); *B60L 2210/10* (2013.01); *B60L 2210/40* (2013.01)

(58) Field of Classification Search
CPC .................................. H02J 3/00; H02J 7/0052
See application file for complete search history.

(56) References Cited

U.S. PATENT DOCUMENTS

| | | | |
|---|---|---|---|
| 6,330,170 B1 | 12/2001 | Wang et al. | |
| 6,488,608 B2 | 12/2002 | Yamaguchi et al. | |
| 7,057,376 B2 | 6/2006 | Cook et al. | |
| 7,450,401 B2 | 11/2008 | Iida | |
| 8,030,882 B2 | 10/2011 | Ito et al. | |
| 8,085,557 B2 | 12/2011 | Ito et al. | |
| 8,395,335 B2 | 3/2013 | Marchand et al. | |
| 8,442,698 B2 | 5/2013 | Fahimi et al. | |
| 2016/0016479 A1* | 1/2016 | Khaligh | B60L 11/1812 363/17 |

* cited by examiner

*Primary Examiner* — Jeffrey M Shin
(74) *Attorney, Agent, or Firm* — Brooks Kushman P.C.

(57) ABSTRACT

In at least one embodiment, a bi-directional power conversion device including a DC/DC converter, an inverter, and a bi-directional store device is disclosed. The DC/DC converter is configured to generate a first direct current (DC) output in response to a first DC input in a consumer mode and to receive a second DC input to power the low voltage zone in a vehicle charge mode. The inverter is configured to generate an alternating current (AC) output to power at least one consumer device in response to the first DC output in the consumer mode and to provide the second DC input to the DC/DC converter in response to an AC input signal from an AC power source in the vehicle charge mode. The bi-directional storage device is configured to store the first DC output in the consumer mode and to store the second DC input in the vehicle charge mode.

20 Claims, 3 Drawing Sheets

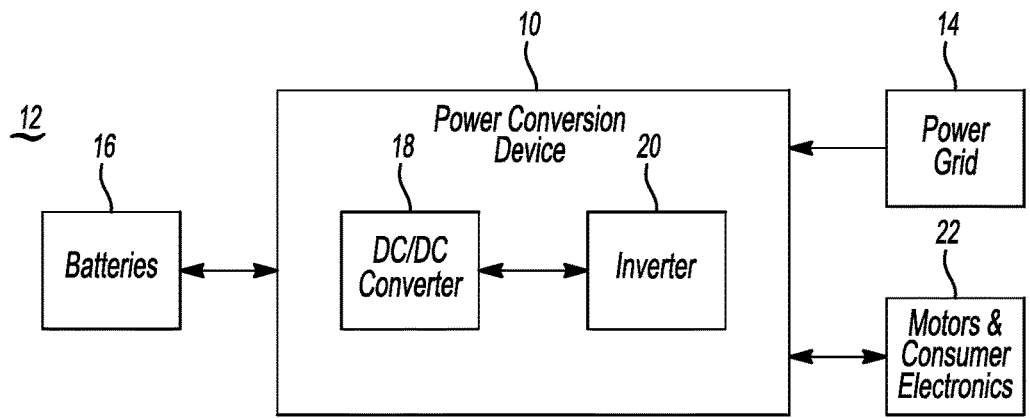
_Fig-1_
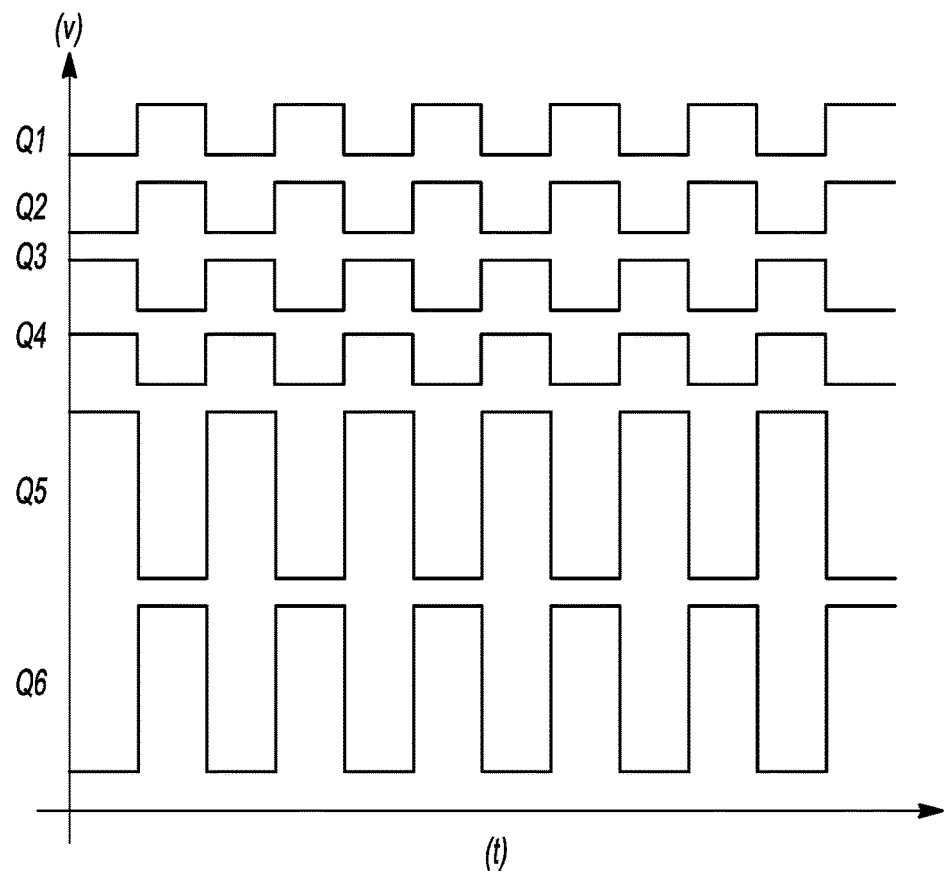
_Fig-3_

US 10,348,088 B2

BI-DIRECTIONAL LOW VOLTAGE DC TO AC INVERTER

TECHNICAL FIELD

Aspects disclosed herein generally relate to a bi-directional power conversion device that converts low voltage direct current (DC) energy into an alternating current (AC) for powering aspects of a vehicle and that converts AC energy from a grid into low voltage DC energy for storage on a vehicle DC power supply.

BACKGROUND

U.S. Pat. No. 8,085,557 ("the '557 patent") discloses a bi-directional DC-AC inverter that includes H bridge circuit, a connecting portion connected to the H bridge circuit, a smoothing filter that connects the connecting portion to the H bridge circuit, and a control section. The H bridge circuit has four switching elements. The four switching elements include two first switching elements first ends of which are connected to each other and two second switching elements second ends of which are connected to each other. The smoothing filter has a capacitor and two coils connected to the capacitor. The control section controls the first switching elements in such a manner that the two coils function as booster coils when an alternating voltage input from a system power supply is converted to a direct current voltage.

SUMMARY

In at least one embodiment, a bi-directional power conversion device including a DC/DC converter, an inverter, and a bi-directional store device is disclosed. The DC/DC converter is configured to generate a first direct current (DC) output in response to a first DC input from a low voltage zone in a consumer mode and to receive a second DC input to power the low voltage zone in a vehicle in a vehicle charge mode. The inverter is configured to generate an alternating current (AC) output to power at least one consumer device in response to the first DC output in the consumer mode and to provide the second DC input to the DC/DC converter in response to an AC input signal from an AC power source in the vehicle charge mode. The bi-directional storage device is configured to store the first DC output in the consumer mode and to store the second DC input in the vehicle charge mode.

In at least another embodiment, a bi-directional power conversion device including a DC/DC converter, an inverter, and a bi-directional storage device is disclosed. The DC/DC converter is configured to generate a first direct current (DC) output in response to a first DC input from a low voltage zone to power at least one consumer device in a consumer mode and to receive a second DC input to power a low voltage zone in a vehicle in a vehicle charge mode. The second DC input power is indicative of a final DC input that is stored on one or more batteries in the low voltage zone. The inverter is configured to generate an alternating current (AC) output to power the at least one consumer device in response to the first DC output in the consumer mode and to provide the second DC input to the DC/DC converter in response to an AC input signal from an AC power source in the vehicle charge mode. The bi-directional storage device is configured to store the first DC output in the consumer mode and to store the second DC input in the vehicle charge mode.

In at least one embodiment, a bi-directional power conversion device including a DC/DC converter, an inverter, and a bi-directional store device is disclosed. The DC/DC converter includes a first plurality of switching devices and is configured to generate a first direct current (DC) output in response to a first DC input from a low voltage zone in a consumer mode and to receive a second DC input to power the low voltage zone in a vehicle in a vehicle charge mode. The inverter includes a second plurality of switching devices and is configured to generate an alternating current (AC) output to power at least one consumer device in response to the first DC output in the consumer mode and to provide the second DC input to the DC/DC converter in response to an AC input signal from an AC power source in the vehicle charge mode. The bi-directional storage device is configured to store the first DC output in the consumer mode and to store the second DC input in the vehicle charge mode.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 1 depicts a bi-directional power conversion device positioned within a vehicle that converts low voltage direct current (DC) energy into an alternating current (AC) for powering aspects of a vehicle and that converts AC energy from a power grid into low voltage DC energy for storage on a vehicle DC power supply in accordance to one embodiment;

FIG. 3 depicts various waveforms for driving one or more of a plurality of switching devices positioned within the vehicle for converting the low voltage (DC) energy into the alternating current (AC) during a consumer mode in accordance to one embodiment;

DETAILED DESCRIPTION

Figure 2:
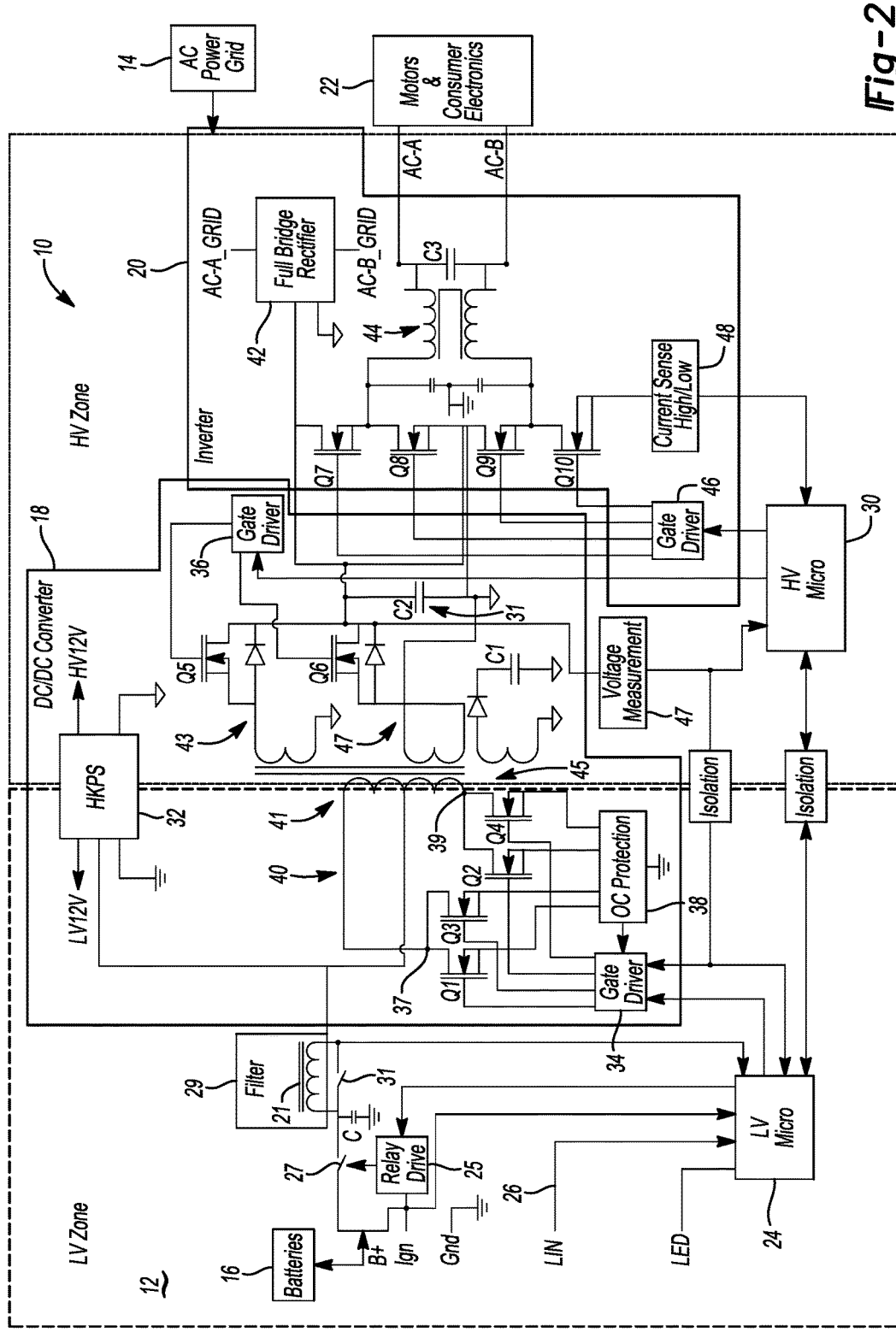
FIG. 2 depicts a detailed implementation of the apparatus in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

An apparatus or bi-directional power conversion device is provided herein and is arranged to receive alternating current (AC) power from a power grid for purposes of charging one or more batteries in the vehicle by providing a low voltage direct current (DC) level to the one or more batteries. Conversely, the power conversion device is arranged to receive and invert the low voltage DC level from the one or more batteries to generate AC power for powering AC loads in the vehicle. For example, the power conversion device may provide the AC power to various electric motors and/or consumer devices that are electrically coupled to the vehicle. These aspects and others will be discussed in more detail below.

FIG. 1 depicts a bi-directional power conversion device 10 positioned within a vehicle 12 that converts low voltage DC energy (e.g., a first DC input) into AC energy for powering aspects of the vehicle 12. The power conversion device 10 converts AC energy from a power grid 14 into low voltage DC energy (e.g., a final DC input) for storage on a vehicle DC power supply (e.g., one or more batteries 16). The power conversion device 10 includes a DC/DC converter 18 and an inverter 20. In a consumer mode, the DC/DC converter 18 boosts the DC energy from the batteries 16 in a low voltage (LV) zone (i.e., LV Zone) into a DC level (e.g., boosted DC level or a first DC output) that is fed to the inverter 20. The inverter 20 generates an AC output to power one or more motors and/or various consumer electronics (hereafter "AC power loads 22") that are electrically coupled to the vehicle 12 in response to the boosted DC level. A bi-directional storage device 31 (or capacitor C2) stores the boosted DC level prior to the inverter 20 generating the AC output. In a vehicle charge mode, the power conversion device 10 detects that the power grid 14 is coupled thereto for charging the batteries 16 or powering electrical devices within the vehicle 12. The inverter 20 converts AC energy from the power grid 14 into an input DC signal (or second DC input) which is stored on the bi-directional storage device 31. The DC/DC converter 18 converts the input DC signal into a low DC energy that is provided to the batteries 16 and/or powers other aspects of the vehicle 12.

FIG. 2 depicts a detailed implementation of the power conversion device 10 in accordance to one embodiment. The vehicle 12 includes a first controller 24 (or first "low voltage (LV) microcontroller") that is operably coupled to the DC/DC converter 18 for controlling the operation of the DC/DC converter 18 both in the consumer mode and in the vehicle charge mode. Likewise, the vehicle 12 also includes a second controller 30 that is operably coupled to the inverter 20 for controlling the operation of the inverter both in the consumer mode and the vehicle charge mode. The first controller 24 and the second controller 30 engage in bi-directional communication with one another via a serial communication interface (SCI) or other suitable communication bus protocol.

The following operations are performed when the power conversion device 10 is in the consumer mode. In general, the DC/DC converter 18 is configured to provide the DC energy from the vehicle 12 to the inverter 20 for purposes of providing the AC output to the AC power loads 22. In the consumer mode, ignition status for the vehicle 12 is either in the "Accessory" or "Run" position. In this case, the first controller 24 controls the DC/DC converter 18 to provide the boosted DC energy to the inverter 20 when the ignition status is detected to be in the "Accessory" or "Run" position. As shown, the first controller 24 includes an input for monitoring ignition status on feed "IGN." It is recognized that the first controller 24 may alternatively receive ignition status via a first data communication bus 26 that utilizes, but is not limited to, a local interconnect network (LIN), controller area network (CAN) or other suitable data communication protocol.

A relay driver 25 closes a switch 27 to enable the DC energy to flow from the batteries 16 and to the DC/DC converter 18. It is recognized that the relay driver 25 is optional and a solid state switch may be used in place of the relay driver 25. A switch 21 and filter 29 are positioned between the switch 27 and the DC/DC converter 18. The filter 29 includes an inductor L1 and a capacitor C. The first controller 24 controls the switch 21 to close thereby enabling the DC energy to pass from the batteries 16 to the DC/DC converter 18.

The DC/DC converter 18 generally includes a housekeeping power supply 32, a first gate driver 34, a second gate driver 36, an over circuit protection block 38, and a first transformer 40. The housekeeping power supply 32 is generally configured to provide power to various electronics of the power conversion device 10. The DC/DC converter 18 also includes a first plurality of switching devices (e.g., MOSFETs) Q1-Q6 and a first plurality of capacitors C1-C2. The capacitor C2 is generally defined as the bi-directional storage device 31. The first controller 24 is configured to control the first gate driver 34 for controlling the switching devices Q1-Q4. The first controller 24 is also configured to control the second gate driver 36 for controlling the switching devices Q5 and Q6. The switching devices Q5 and Q6 may be implemented as diode rectifiers or as synchronous rectifiers. The switching devices Q1-Q6 may be implemented as MOSFET switching devices with their respective body diodes acting as standard diode rectifiers when inactive. The DC/DC converter 18 may be arranged as a push-pull converter.

In the consumer mode, the first controller 24 pulse width modulates (via the first gate driver 34) the switching devices Q1 and Q3 in the manner illustrated in connection with FIG. 3. In general, each pulse for Q1 and Q3 may be modulated with a switching frequency of, for example, 65 kHz with an amplitude of 12V. It is recognized that other values may be used. As shown in FIG. 1, the switching devices Q1 and Q3 are operatively connected to a first input 37 on a first side 41 of the first transformer 40. In this manner, a first output 43 from the first side 41 of the first transformer 40 generates a pulse width modulated signal which is provided to the switching device Q5. The second gate driver 36 pulse width modulates the switching device Q5 as illustrated in FIG. 3.

The pulse width modulated signal as illustrated in FIG. 3 in connection with the switching device Q5 may have a switching frequency of 65 kHz and an amplitude of 120V. It is recognized that the switching device Q5 may also be connected in parallel to the switching devices Q1 and Q3 or the switching device Q5 may be connected to the first transformer 40 as shown in FIG. 2.

Figure 4:
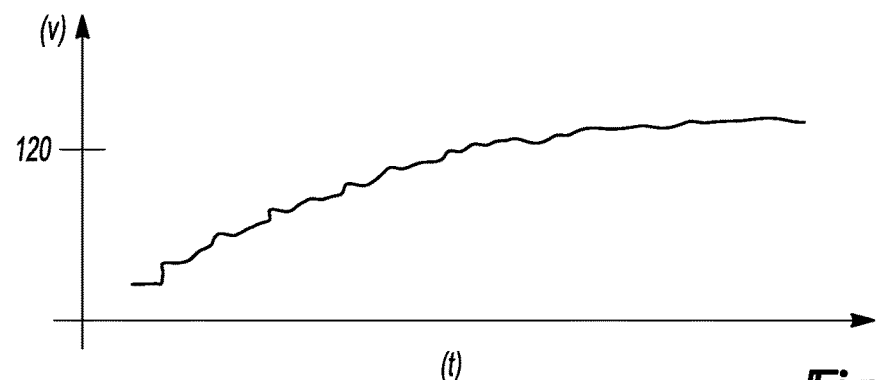
FIG. 4 illustrates a waveform corresponding to a stored voltage across a bulk capacitor over time in accordance to one embodiment.

Additionally, the first controller 24 pulse width modulates (via the first gate driver 34) the switching devices Q2 and Q4 in the manner illustrated in connection with FIG. 3. Each pulse for Q2 and Q4 may be modulated with a switching frequency of, for example, 65 kHz with an amplitude of 12V. It is recognized that other values may be used. As shown in FIG. 1, the switching devices Q2 and Q4 are operatively connected to a second input 39 on a second side 45 of the first transformer 40. In this manner, a second output 47 from the first side 41 of the first transformer 42 generates a pulse width modulated signal which is provided to the switching device Q6. The second gate driver 36 pulse width modulates the switching device Q6 in the manner illustrated in FIG. 3. This pulse width modulated signal is illustrated in FIG. 3 in connection with the switching device Q6 may have a switching frequency of 65 kHz and an amplitude of 120V. It is recognized that the switching device Q6 may also be connected in parallel to the switching devices Q2 and Q4 or the switching device Q6 may be connected to the first transformer 40 as shown in FIG. 2. The bi-directional storage device 31 (or the capacitor C2) stores the output voltage from the power switching devices Q5 and Q6. FIG. 4 illustrates the amount of voltage that is stored on the bi-directional storage device 31 over time. At some point, the stored voltage reaches an amplitude of approximately 120V and levels off at this value. A voltage measurement device 49 (e.g., sensor) measures the voltage across bi-directional storage device 31 and transmits a signal indicative of the measured voltage so that the first controller 24 controls the switching frequency for the switching devices Q1-Q4 and that the second controller 30 controls the switching frequency for the switching device Q5-Q6 accordingly.

Figure 5:
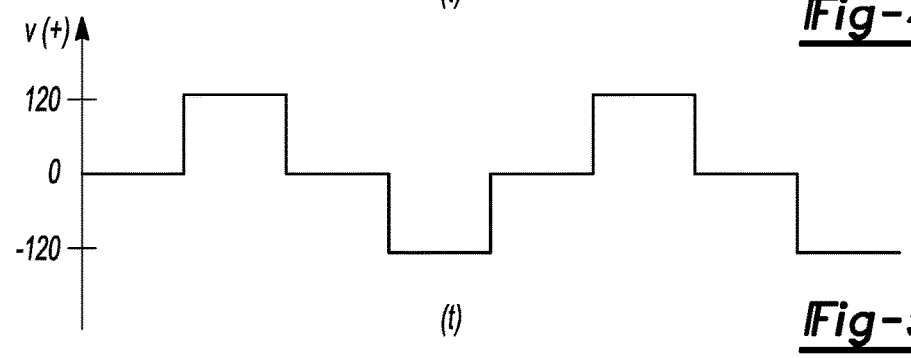
FIG. 5 depicts a waveform corresponding to an AC output to various motors/consumer electronics in accordance to one embodiment.

The bi-directional storage device 31 provides the stored voltage (e.g., 120V DC) to the inverter 20. The inverter 20 generally includes a rectifier (e.g., full bridge rectifier) 42, a choke 44, a gate driver 46, a current sense circuit 48, a second plurality of switching devices Q7-Q10, and a capacitor C3. The switching devices Q7-Q10 generally form an inverter bridge in which a pair of the switching devices (e.g., Q7/Q9 or Q8/Q10) is activated (or closed) while the remaining pair of the switching devices (e.g., Q8/Q10 and Q7/Q9) is opened in the vehicle charge mode. It is recognized that the switching devices Q7-Q10 may be implemented as MOSFET switching devices with their respective body diodes acting as standard diode rectifiers when inactive. An output from the inverter bridge (e.g., the switching devices Q7-Q10) is provided to the choke 44. The choke 44 may be implemented as a common mode choke (or as two differential inductors). The choke 44 and the capacitor C3 block high frequency AC. An AC based output from the choke 44 and the capacitor C3 (or from the inverter 20) is generally shown in FIG. 5. This output represents the AC output that is provided to the AC power loads 22. It is recognized that the full bridge rectifier 42 may be used in place of the switching devices Q7-Q10. For example, the bi-directional storage device 31 within the DC/DC converter 18 may provide the output voltage from the power switching devices Q5 and Q6 to the full bridge rectifier 42 to generate the AC output (see FIG. 5) for driving the AC power loads 22.

Figure 6:
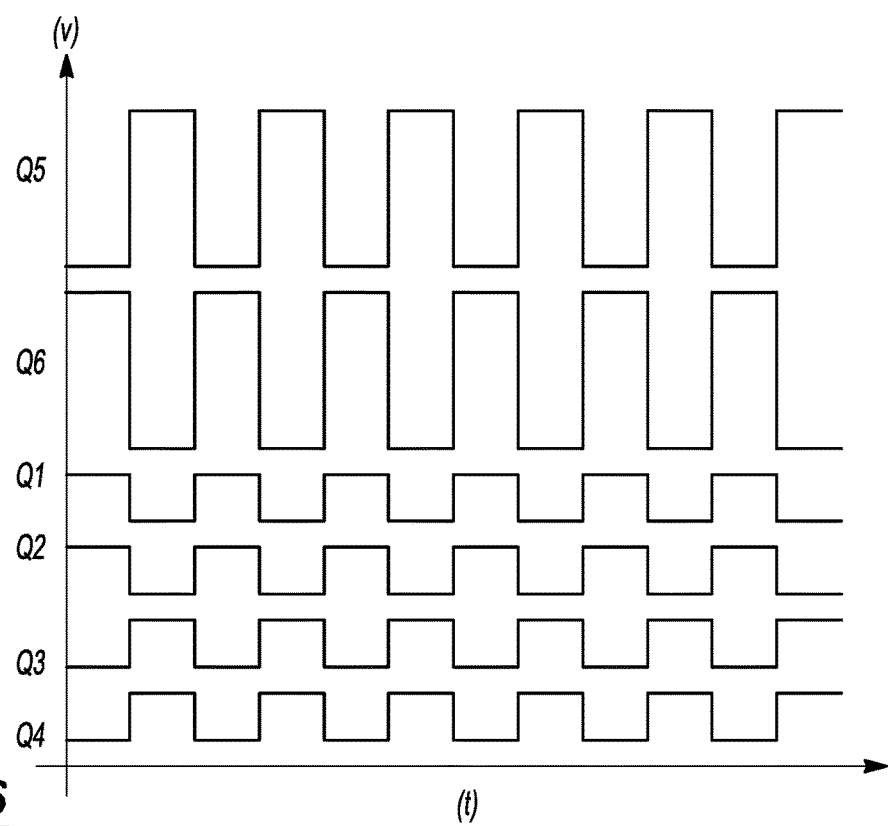
FIG. 6 depicts various waveforms for driving one or more of the plurality of switching devices positioned within the vehicle for rectifying the AC energy from a grid into low voltage DC energy for storage on a vehicle DC power supply during a vehicle charge mode in accordance to one embodiment.

In the vehicle charge mode, the second controller 30 detects when the vehicle 12 is connected to a battery charger (e.g., portable or stationary charger) (not shown) to receive AC power from the AC power grid 14. Alternatively, the second controller 30 may also detect when various AC power loads 22 (e.g., motors) generate AC power for storage on the batteries 16 (e.g., regenerative braking, etc.). The second controller 30 transmits a wake up message to the first controller 24 in the event the vehicle 12 is asleep upon detecting that the battery charger is arranged to transmit AC power from the AC power grid 14. The full bridge rectifier 42 or the second plurality of switching devices Q7-Q10 generates approximately a 150V DC input for storage on the bi-directional storage device 31 in response to receiving an AC input of, for example, 110 VAC (or up to 150 VAC or even higher) from the AC power grid 14. The overall boost from 110 VAC to 150V may be attributed to the fact that the 110V AC input is an RMS value. The peak value of 110V AC is 110V*√2 which yields roughly 150V. The second controller 30 controls the switching frequency of the second plurality of switching devices Q7-Q10 (via the gate driver 46) (if utilized as opposed to the full bridge rectifier 42) which then rectifies the increased AC input to generate a DC voltage of 150 VDC for storage on the bi-directional storage device 31. The second controller 30 then pulse width modulates the DC voltage to the switching devices Q5 and Q6 in the manner illustrated in FIG. 6. The pulse width modulated signal as illustrated in FIG. 6 in connection with the switching device Q5 may have a switching frequency of 65 kHz and an amplitude of a maximum of 150V (i.e., assuming the AC input is at a peak voltage of 150V). In addition, the pulse width modulated signal as illustrated in FIG. 6 in connection with the switching device Q6 may have a switching frequency of 65 kHz and an amplitude of 150V.

The first transformer 40 steps down the amplitude from approximately 150V to approximately 15V. The first controller 24 pulse width modulates (via the first gate driver 34) the switching devices Q1 and Q3 in the manner illustrated in connection with FIG. 6. In general, each pulse for Q1 and Q3 may be modulated with a duty cycle of, for example, 90% and an amplitude of 15V. It is recognized that other values may be used. As shown in FIG. 1, the switching devices Q1 and Q3 are operatively connected to a first side 41 of the first transformer 40. Thus, the switching devices Q1 and Q3 receive an output from the first side 41 of the first transformer 40. The output from the switching devices Q1 and Q3 may than generate a DC output voltage that is 13.5V as defined by the following equation:

$$V_{out(switching\ devices)} = (V\text{trans\_In/turns of transformer}) * \text{duty cycle} \quad \text{(Eq. 1)}.$$

In this case, Vtrans_In is approximately 150V, the number of turns of the transformer is equal to 10, and the duty cycle of the switching devices Q1 and Q3 is 90%. These values result in an output from the switching devices Q1 and Q3 of 13.5V which is stored on capacitor C1. If the duty cycle of the switching devices Q1 and Q3 was 80%, then $V_{out(switching\ devices)} = 12V$ DC which is stored on the capacitor C1.

Similarly, the first controller 24 pulse width modulates (via the first gate driver 34) the switching devices Q2 and Q4 in the manner illustrated in connection with FIG. 7. In general, each pulse for Q2 and Q4 may be modulated with a duty cycle of, for example, 90% and an amplitude of 15V. It is recognized that other values may be used. As shown in FIG. 1, the switching devices Q2 and Q4 are operatively connected to the second side 45 of the first transformer 40.

Thus, the switching devices Q2 and Q4 receive an output from the second side 45 of the first transformer 40. Similar to the switching devices Q1 and Q3, the switching devices Q2 and Q4 may generate a DC output voltage that is 13.5 based on equation 1 which is stored on the capacitor C1.

In the vehicle charge mode, the first controller 24 opens the switch 21 so that the output from the switching devices Q1-Q4 is passed to the filter 29. The filter 29 regulates the voltage and current from the output of the switching devices Q1-Q4. The batteries 16 then receive and store a DC filtered output from the filter 29 (or from the capacitor C1).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bi-directional power conversion device comprising:
    a DC/DC converter configured to:
        generate a first direct current (DC) output in response to a first DC input from a low voltage zone in a consumer mode; and
        receive a second DC input to power the low voltage zone in a vehicle in a vehicle charge mode;
    an inverter configured to:
        generate an alternating current (AC) output to power at least one consumer device in response to the first DC output in the consumer mode; and
        provide the second DC input to the DC/DC converter in response to an AC input signal from an AC power source in the vehicle charge mode; and
    a bi-directional storage device configured to store the first DC output in the consumer mode and to store the second DC input in the vehicle charge mode,
    wherein the DC/DC converter includes a transformer having a first input and a first output on a first side of the transformer and a second input and a second output on a second side of the transformer,
    wherein the DC/DC converter includes a first plurality of switching devices that provide a first DC switching input signal to the first input of the first side of the transformer and a second plurality of switching devices that provide a second DC switching input signal to the second input of the second side of the transformer,
    wherein the first output of the transformer provides a first DC transformer output to a first switching device and wherein the first switching device generates the first DC output to store on the bi-directional storage device in the consumer mode, and
    wherein the first output of the transformer provides a first DC transformer output to a first switching device and wherein the first switching device generates the first DC output to store on the bi-directional storage device in the consumer mode, and
    wherein the second output of the transformer provides a second DC transformer output to a second switching device and wherein the second switching device generates the first DC output to store on the bi-directional storage device in the consumer mode.

2. The bi-directional power conversion device of claim 1 further comprising a voltage measurement circuit configured to measure the first DC output on the bi-directional storage device to control a switching frequency of the first plurality of switches, the second plurality of switches, the first switching device and the second switching device.

3. The bi-directional power conversion device of claim 1, wherein the inverter includes one of a plurality of switching devices and a full bridge rectifier to convert the first DC output stored on the bi-directional storage device into the AC output to power the at least one consumer device the consumer mode.

4. The bi-directional power conversion device of claim 1 wherein the inverter includes one of a plurality of switching devices and a full bridge rectifier to convert the AC input signal into the second DC input for storage on the bi-directional storage device in the vehicle charge mode.

5. The bi-directional power conversion device of claim 4 wherein the DC/DC converter includes a transformer having a first side and a second side to reduce the second DC input into a reduced second DC input in the vehicle charge mode.

6. The bi-directional power conversion device of claim 5 wherein the DC/DC converter includes a first plurality of switches that receive the reduced second DC input from the first side and a second plurality of switches that receive the reduced second DC input from the second side.

7. The bi-directional power conversion device of claim 6 wherein the first plurality of switches and the second plurality of switches are selectively controlled to convert the reduced second DC input into a final DC input for storage on one or more batteries in the low voltage zone in the vehicle charge mode.

8. The bi-directional power conversion device of claim 7 further comprising a filter to regulate voltage and current on the final DC input for storage on the one or more batteries in the low voltage zone.

9. The bi-directional power conversion device of claim 1 wherein the bi-directional storage device is a capacitor.

10. The bi-directional power conversion device of claim 9 where the capacitor is positioned within the DC/DC converter.

11. The bi-directional power conversion device of claim 1 wherein the DC/DC converter includes a first plurality of switching devices that provide the first DC output to the bi-directional storage device in the consumer mode.

12. The bi-directional power conversion device of claim 11 wherein the inverter includes a second plurality of switching devices that provide the second DC input to the bi-directional storage device in the vehicle charge mode.

13. A bi-directional power conversion device comprising:
    a DC/DC converter configured to:
        generate a first direct current (DC) output in response to a first DC input from a low voltage zone to power at least one consumer device in a consumer mode; and
        receive a second DC input to power a low voltage zone in a vehicle in a vehicle charge mode; and
    an inverter configured to:
        generate an alternating current (AC) output to power the at least one consumer device in response to the first DC output in the consumer mode;
        provide the second DC input to the DC/DC converter in response to an AC input signal from an AC power source in the vehicle charge mode;
    a bi-directional storage device configured to store the first DC output in the consumer mode and to store the second DC input in the vehicle charge mode; and
    a filter electrically coupled to an output of the DC/DC converter configured to:

receive a final DC input from the output of the DC/DC converter when the vehicle is in the vehicle charge mode based on the second DC input, and regulate voltage and current on the final DC input to store a regulated final DC input on one or more batteries in the low voltage zone.

14. The bi-directional power conversion device of claim 13 wherein the bi-directional storage device is a capacitor.

15. The bi-directional power conversion device of claim 14 where the capacitor is positioned within the DC/DC converter.

16. A bi-directional power conversion device comprising:

a DC/DC converter including a first plurality of switches and being configured to:

generate a first direct current (DC) output in response to a first DC input from a low voltage zone to power at least one consumer device in a consumer mode; and receive a second DC input to power a low voltage zone in a vehicle in a vehicle charge mode; and an inverter including a second plurality of switches and being configured to:

generate an alternating current (AC) output to power the at least one consumer device in response to the first DC output in the consumer mode;

provide the second DC input to the DC/DC converter in response to an AC input signal from an AC power source in the vehicle charge mode; and a bi-directional storage device configured to store the first DC output in the consumer mode and to store the second DC input in the vehicle charge mode; and a filter electrically coupled to an output of the DC/DC converter configured to:

receive a final DC input from the output of the DC/DC converter when the vehicle is in the vehicle charge mode base on the second DC input, and regulate voltage and current on the final DC input to store a regulated final DC input on one or more batteries in the low voltage zone.

17. The bi-directional power conversion device of claim 13, wherein the filter is configured to regulate the voltage and current on the final DC input as received from a first plurality of switches of the DC/DC converter.

18. The bi-directional power conversion device of claim 13, wherein the filter includes an inductor and a capacitor.

19. The bi-directional power conversion device of claim 16, wherein the filter is further configured to regulate the voltage and current on the final DC input as received from the first plurality of switches of the DC/DC converter.

20. The bi-directional power conversion device of claim 16, wherein the filter includes an inductor and a capacitor.

* * * * *

UNITED STATES PATENT AND TRADEMARK OFFICE
CERTIFICATE OF CORRECTION

PATENT NO. : 10,348,088 B2  
APPLICATION NO. : 15/367664  
DATED : July 9, 2019  
INVENTOR(S) : Krzysztof Klesyk et al.

Page 1 of 1

It is certified that error appears in the above-identified patent and that said Letters Patent is hereby corrected as shown below:

In the Claims

Column 8, Line 7, Claim 3:
After "to power the at least one consumer device"
Insert -- in --.

Signed and Sealed this
Eighteenth Day of February, 2020

Andrei Iancu
*Director of the United States Patent and Trademark Office*